United States Patent
Chiga et al.

(10) Patent No.: US 9,240,615 B2
(45) Date of Patent: Jan. 19, 2016

(54) NONAQUEOUS ELECTROLYTE AND NONAQUEOUS ELECTROLYTE SECONDARY BATTERY

(71) Applicant: SANYO Electric Co., Ltd., Moriguchi-shi, Osaka (JP)

(72) Inventors: Takanobu Chiga, Osaka (JP); Satoshi Takatsuka, Okayama (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 151 days.

(21) Appl. No.: 14/239,638

(22) PCT Filed: Sep. 25, 2012

(86) PCT No.: PCT/JP2012/074529
§ 371 (c)(1),
(2) Date: Feb. 19, 2014

(87) PCT Pub. No.: WO2013/047502
PCT Pub. Date: Apr. 4, 2013

(65) Prior Publication Data
US 2014/0220429 A1     Aug. 7, 2014

(30) Foreign Application Priority Data
Sep. 29, 2011    (JP) ................................ 2011-214165

(51) Int. Cl.
*H01M 10/0567*     (2010.01)
*H01M 10/056*      (2010.01)
*H01M 10/052*      (2010.01)

(52) U.S. Cl.
CPC ........ *H01M 10/0567* (2013.01); *H01M 10/052* (2013.01); *Y02E 60/122* (2013.01)

(58) Field of Classification Search
None
See application file for complete search history.

(56) References Cited

U.S. PATENT DOCUMENTS

| 5,626,981 | A | | 5/1997 | Simon et al. | |
|---|---|---|---|---|---|
| 5,750,730 | A | * | 5/1998 | Nakano | C07D 317/42 549/229 |
| 2013/0164603 | A1 | * | 6/2013 | Suguro | H01M 4/622 429/163 |

FOREIGN PATENT DOCUMENTS

| JP | 08-45545 A | | 2/1996 |
|---|---|---|---|
| JP | 2004-303437 A | | 10/2004 |
| JP | 2006-252829 A | | 9/2006 |
| JP | 2011-150873 A | | 8/2011 |
| WO | 2012/029625 | * | 3/2012 |

OTHER PUBLICATIONS

International Search Report, dated Jan. 8, 2013, issued in corresponding application No. PCT/JP2012/074529.

* cited by examiner

*Primary Examiner* — Jonathan Crepeau
(74) *Attorney, Agent, or Firm* — Westerman, Hattori, Daniels & Adrian, LLP

(57) ABSTRACT

There is provided a nonaqueous electrolyte that can suppress swelling of a nonaqueous electrolyte secondary battery. A nonaqueous electrolyte for a nonaqueous electrolyte secondary battery 1 contains a lithium salt, vinylene carbonate, and a compound represented by general formula (1) below. In the general formula (1), X is an alkylene group with 2 to 4 carbon atoms that may have a substituent. Rf is a fluorine-containing linear or branched alkyl group with 1 to 6 carbon atoms. R is a linear, branched, or cyclic alkyl group with 1 to 6 carbon atoms that may have a substituent.

(1)

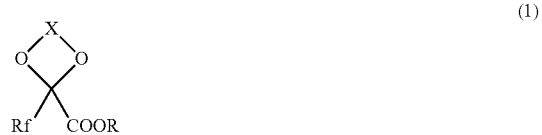

7 Claims, 1 Drawing Sheet

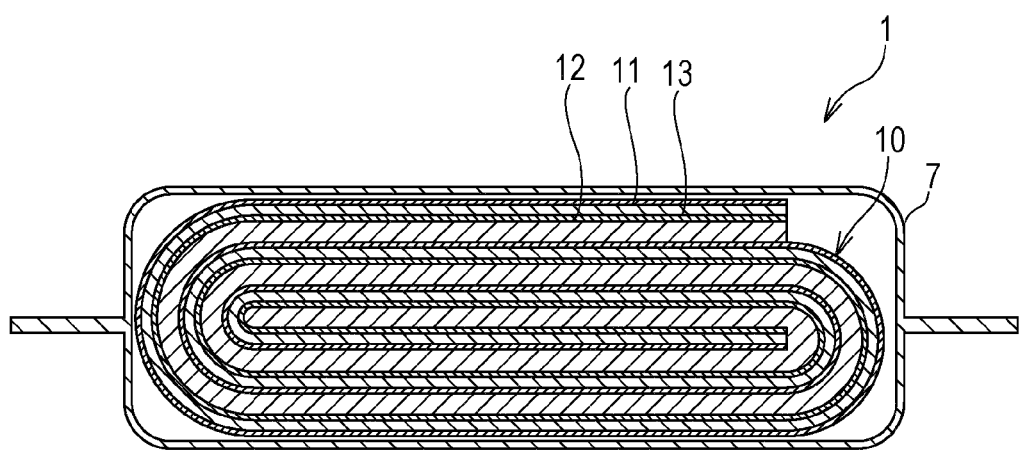

NONAQUEOUS ELECTROLYTE AND NONAQUEOUS ELECTROLYTE SECONDARY BATTERY

TECHNICAL FIELD

The present invention relates to a nonaqueous electrolyte and a nonaqueous electrolyte secondary battery.

BACKGROUND ART

Nonaqueous electrolyte secondary batteries such as lithium secondary batteries have been widely used in electronic devices such as cellular phones, notebook computers, and PDAs.

In general, a carbon material such as graphite is used for a negative electrode active material of nonaqueous electrolyte secondary batteries. However, when a carbon material is used for a negative electrode active material, an organic solvent or the like contained in a nonaqueous electrolyte is decomposed by reduction at a surface of an electrode in the charge–discharge process of a nonaqueous electrolyte secondary battery, resulting in the generation of gas and the deposition of decomposed products. This poses problems such as the decrease in charge–discharge efficiency and the degradation of charge–discharge cycle characteristics.

For example, PTL 1 discloses, as a method that overcomes the above problems, a method in which vinylene carbonate is added to a nonaqueous electrolyte.

CITATION LIST

Patent Literature

PTL 1: Japanese Published Unexamined Patent Application No. 8-45545

SUMMARY OF INVENTION

Technical Problem

However, in the case where vinylene carbonate is simply added to a nonaqueous electrolyte, if a nonaqueous electrolyte secondary battery is continuously charged at high temperature, a large amount of gas is generated, which poses problems such as swelling of the nonaqueous electrolyte secondary battery.

It is a main object of the present invention to provide a nonaqueous electrolyte that can suppress swelling of nonaqueous electrolyte secondary batteries.

Solution to Problem

A nonaqueous electrolyte for a nonaqueous electrolyte secondary battery according to the present invention contains a lithium salt, vinylene carbonate, and a compound represented by general formula (1) below.

[Chem. 1]

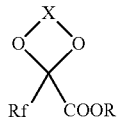

(1)

In the general formula (1), X is an alkylene group with 2 to 4 carbon atoms that may have a substituent. Rf is a fluorine-containing linear or branched alkyl group with 1 to 6 carbon atoms. R is a linear, branched, or cyclic alkyl group with 1 to 6 carbon atoms that may have a substituent.

A nonaqueous electrolyte secondary battery according to the present invention includes the nonaqueous electrolyte, a positive electrode, a negative electrode, and a separator.

Advantageous Effects of Invention

According to the present invention, a nonaqueous electrolyte that can suppress swelling of nonaqueous electrolyte secondary batteries can be provided.

BRIEF DESCRIPTION OF DRAWING

FIG. 1 is a schematic sectional view showing a nonaqueous electrolyte secondary battery according to an embodiment of the present invention.

DESCRIPTION OF EMBODIMENTS

A preferred embodiment of the present invention will now be described. The embodiment below is merely an example and the present invention is not limited to the embodiment below.

The drawing referred to in the embodiment is a schematic drawing. For example, the dimensional ratio of an object illustrated in the drawing may be different from that of the actual object. The dimensional ratio of a specific object should be judged in consideration of the following description.

As illustrated in FIG. 1, a nonaqueous electrolyte secondary battery 1 includes a battery case 17. In this embodiment, the battery case 17 is a flat aluminum laminate case. However, in the present invention, the battery case is not limited to the flat aluminum laminate case. The battery case 17 may be, for example, a cylindrical case or a prismatic case.

The battery case 17 contains an electrode body 10 impregnated with a nonaqueous electrolyte.

The nonaqueous electrolyte contains a lithium salt and a nonaqueous solvent.

Examples of the lithium salt include $LiXF_y$ (where X is P, As, Sb, B, Bi, Al, Ga, or In; and y is 6 when X is P, As, or Sb or y is 4 when X is B, Bi, Al, Ga, or In), lithium perfluoroalkylsulfonic acid imide $LiN(C_mF_{2m+1}SO_2)(C_nF_{2n+1}SO_2)$ (where m and n are each independently an integer of 1 to 4), lithium perfluoroalkylsulfonic acid methide $LiC(C_pF_{2p+1}SO_2)(C_qF_{2q+1}SO_2)(C_rF_{2r+1}SO_2)$ (where p, q, and r are each independently an integer of 1 to 4), $LiCF_3SO_3$, $LiClO_4$, $Li_2B_{10}Cl_{10}$, and $Li_2B_{12}Cl_{12}$. Among these lithium salts, $LiPF_6$, $LiBF_4$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$ are preferred. The nonaqueous electrolyte may contain one type of lithium salt or multiple types of lithium salts.

Examples of the nonaqueous solvent of the nonaqueous electrolyte include cyclic carbonates, chain carbonates, and mixed solvents of cyclic carbonates and chain carbonates. Specific examples of the cyclic carbonates include ethylene carbonate, propylene carbonate, butylene carbonate, and vinylene carbonate. Specific examples of the chain carbonate include dimethyl carbonate, ethylmethyl, carbonate, and diethyl carbonate. Among them, a mixed solvent of a cyclic carbonate and a chain carbonate is preferably used as a nonaqueous solvent having low viscosity, a low melting point, and high lithium ion conductivity. In the mixed solvent of a cyclic carbonate and a chain carbonate, the mixing ratio (cyclic carbonate:chain carbonate) of the cyclic carbonate and the chain carbonate is preferably in the range of 1:9 to 5:5 on a volume basis.

The nonaqueous electrolyte may be a gel polymer electrolyte obtained by impregnating a polymer electrolyte such as polyethylene oxide or polyacrylonitrile with an electrolytic solution.

The nonaqueous electrolyte further contains vinylene carbonate and a compound represented by general formula (1) below.

[Chem. 2]

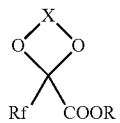

(1)

In the compound represented by the general formula (1), X is an alkylene group with 2 to 4 carbon atoms that may have a substituent. X is preferably an alkylene group with 2 or 3 carbon atoms that may have a substituent and more preferably an ethylene group or a propylene group.

When X has a substituent, the substituent is, for example, an alkyl group with 1 to 4 carbon atoms or a fluorine atom. The number of substituents may be one or two or more. The number of types of substituents may be one or plural.

Rf is a fluorine-containing linear or branched alkyl group with 1 to 6 carbon atoms. Rf is preferably a fluorine-containing linear or branched alkyl group with 1 to 3 carbon atoms, more preferably a linear or branched perfluoroalkyl group with 1 to 3 carbon atoms, and further preferably a trifluoromethyl group.

R is a linear, branched, or cyclic alkyl group with 1 to 6 carbon atoms that may have a substituent. When R has a substituent, the substituent is, for example, a fluorine atom, an alkoxy group, or an acyloxy group. R is preferably a linear, branched, or cyclic alkyl group with 1 to 3 carbon atoms that may have a substituent and more preferably a methyl group. The number of substituents may be one or two or more. The number of types of substituents may be one or plural.

The content of the vinylene carbonate in the nonaqueous electrolyte is preferably 0.05 mass % to 2 mass % and more preferably 0.1 mass % to 1 mass %. The content of the compound represented by the general formula (1) in the nonaqueous electrolyte is preferably 0.05 mass % to 5 mass % and more preferably 0.1 mass % to 3 mass %.

The electrode body 10 is obtained by winding a negative electrode 11, a positive electrode 12, and a separator 13 disposed between the negative electrode 11 and the positive electrode 12.

The separator 13 is not particularly limited as long as the short circuit caused as a result of the contact between the negative electrode 11 and the positive electrode 12 can be suppressed and lithium ion conductivity is achieved through impregnation with a nonaqueous electrolyte. The separator 13 can be composed of a porous membrane made of a resin. Specific examples of the porous membrane made of a resin include a porous membrane made of polypropylene or polyethylene and a laminate of a porous membrane made of polypropylene and a porous membrane made of polyethylene.

The negative electrode 11 includes a negative electrode current collector and a negative electrode active material layer disposed on at least one surface of the negative electrode current collector. The negative electrode current collector can be composed of a foil made of a metal such as Cu or an alloy containing a metal such as Cu.

The negative electrode active material layer contains a negative electrode active material. The negative electrode active material is not particularly limited as long as lithium can be inserted and removed in a reversible manner. Examples of the negative electrode active material include carbon materials, materials that form an alloy with lithium, and metal oxides such as tin oxide. Among these negative electrode active materials, carbon materials are preferred. Specific examples of the carbon materials include natural graphite, synthetic graphite, mesophase pitch-based carbon fiber (MCF), mesocarbon microbeads (MCMB), coke, hard carbon, fullerene, and carbon nanotube. Examples of the materials that form an alloy with lithium include at least one metal selected from the group consisting of silicon, germanium, tin, and aluminum and an alloy containing at least one metal selected from the group consisting of silicon, germanium, tin, and aluminum.

The negative electrode active material layer may contain a carbon conductive agent such as graphite and a binder such as sodium carboxymethyl cellulose (CMC) or styrene-butadiene rubber (SBR).

The positive electrode 12 includes a positive electrode current collector and a positive electrode active material layer disposed on at least one surface of the positive electrode current collector. The positive electrode current collector can be composed of a metal such as Al or an alloy containing a metal such as Al.

The positive electrode active material layer contains a positive electrode active material. In addition to the positive electrode active material, the positive electrode active material layer may appropriately contain materials such as a binder and a conductive agent. A specific example of a preferably used binder is polyvinylidene fluoride. Specific examples of a preferably used conductive agent include carbon materials such as graphite and acetylene black.

The type of positive electrode active material is not particularly limited, and any positive electrode active material can be used. The positive electrode active material preferably has, for example, a layered structure. A preferably used positive electrode active material having a layered structure is a lithium transition metal oxide having a layered structure. Examples of the lithium transition metal oxide include lithium cobaltate, cobalt-nickel-manganese lithium composite oxides, aluminum-nickel-manganese lithium composite oxides, and lithium composite oxides containing at least one of cobalt and manganese, such as aluminum-nickel-cobalt composite oxides. The number of types of positive electrode active materials may be one or two or more.

In the charge–discharge process of a nonaqueous electrolyte secondary battery, a nonaqueous solvent or the like contained in a nonaqueous electrolyte is decomposed by reduction at a surface of an electrode, resulting in the generation of gas and the deposition of decomposed products. This poses problems such as the decrease in charge–discharge efficiency and the degradation of charge–discharge cycle characteristics. For example, a method in which vinylene carbonate is added to a nonaqueous electrolyte is known as a method that overcomes the above problems. When vinylene carbonate is added to a nonaqueous electrolyte, a coating film is formed on a negative electrode, which suppresses the decomposition of an electrolyte component caused by reduction at a surface of the electrode. However, if a nonaqueous electrolyte secondary battery produced by adding vinylene carbonate to a non-aqueous electrolyte is continuously charged at high temperature, a large amount of gas is generated, which poses problems such as swelling of the nonaqueous electrolyte secondary battery.

On the other hand, the nonaqueous electrolyte according to this embodiment contains the compound represented by the general formula (1) above in addition to vinylene carbonate. Therefore, even when the nonaqueous electrolyte secondary battery 1 is continuously charged at high temperature, the nonaqueous electrolyte according to this embodiment can effectively suppress swelling of the nonaqueous electrolyte secondary battery 1. Furthermore, the nonaqueous electrolyte can maintain high initial charge–discharge efficiency of the nonaqueous electrolyte secondary battery 1 and can increase the capacity retention ratio and the capacity recovery ratio. The detailed reason for this is unclear, but may be considered to be as follows. That is, when vinylene carbonate and the compound represented by the general formula (1) above are contained in a nonaqueous electrolyte, a composite film is formed on a negative electrode because these compounds have reduction potentials that are close to each other. The composite film is highly stable even when continuous charging is performed at high temperature and thus can suppress the decomposition of a nonaqueous electrolyte component at a surface of the negative electrode. Moreover, since the amount of elution of the composite film into the nonaqueous electrolyte is small, the decomposition of the eluted composite film at a surface of a positive electrode is also suppressed. Therefore, the generation of gas or the like is suppressed and the above-described characteristics of the nonaqueous electrolyte secondary battery 1 are improved.

Hereafter, the present invention will be further described in detail using specific Examples. The present invention is not limited to Examples below and various modifications can be made without departing from the scope of the present invention.

Example 1

Production of Positive Electrode Plate

LiCoO$_2$ (1.0 mol % of Al and 1.0 mol % of Mg are each dissolved and 0.05 mol % of Zr is attached to a surface) serving as a positive electrode active material, acetylene black serving as a conductive agent, and polyvinylidene fluoride serving as a binder were kneaded with N-methylpyrrolidone serving as a solvent to prepare a slurry. The prepared slurry was uniformly applied onto both surfaces of a positive electrode current collector (aluminum foil with a thickness of 15 μm), and then the solvent was removed by passing the positive electrode through a dryer. The resulting product was rolled with a roll press to obtain a positive electrode plate having a packing density of 3.8 g/cc.

[Production of Negative Electrode Plate]

Graphite powder serving as a negative electrode active material and carboxymethyl cellulose and styrene-butadiene rubber each serving as a binder were kneaded with water serving as a solvent to prepare a negative electrode active material slurry. The prepared slurry was applied to a negative electrode current collector (10 μm copper foil), and then the solvent was removed by passing the negative electrode through a dryer. The resulting product was rolled with a roll press to obtain a negative electrode plate having a packing density of 1.6 g/cc.

[Production of Electrode Body]

The positive electrode plate and the negative electrode plate were laid one on top of the other such that the positive electrode plate and the negative electrode plate sandwiched a separator composed of a polyolefin-based microporous membrane therebetween and the center lines of the electrode plates in the width direction were aligned. Subsequently, winding was performed with a winder and the outermost periphery was taped to obtain a wound electrode body. The wound electrode body was then pressed to obtain a flat electrode body.

[Production of Nonaqueous Electrolyte]

Ethylene carbonate (EC) and ethylmethyl carbonate (EMC) were mixed with each other at a volume ratio of EC/EMC=30/70 to prepare a nonaqueous solvent. LiPF$_6$ was added to the nonaqueous solvent so as to have a concentration of 1.0 M in the nonaqueous solvent. Furthermore, vinylene carbonate (VC) and 2-(trifluoromethyl)-1,3-dioxolane-2-carboxylic acid methyl ester (compound 1) represented by general formula (2) below were added such that the contents of the vinylene carbonate and compound 1 in the nonaqueous electrolyte were each 1 mass %.

[Chem. 3]

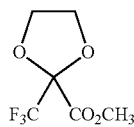

(2)

[Production of Nonaqueous Electrolyte Secondary Battery]

The flat electrode body was inserted into a flat aluminum laminate exterior body and a portion other than an injection port was heat-sealed to produce a battery before injection. Subsequently, a particular amount of nonaqueous electrolyte was injected into the battery before injection through the injection port and then an impregnation treatment under reduced pressure was performed. Furthermore, the injection port was heat-sealed to produce a nonaqueous electrolyte secondary battery (hereafter may be simply referred to as a battery). The design capacity of the produced battery was 750 mAh.

[Evaluation of Initial Charge-Discharge Efficiency]

The battery was charged at a constant current of 1 It (750 mA) until the voltage of the battery reached 4.4 V and then charged at a constant voltage of 4.4 V until the current reached 1/20 It (37.5 mA). This charge capacity was defined as an initial charge capacity.

Subsequently, the battery was discharged at a constant current of 1 It (750 mA) until the voltage of the battery reached 2.75 V. This discharge capacity was defined as an initial discharge capacity. The initial charge–discharge efficiency was determined from the formula below. Table 1 shows the evaluation results.

Initial charge–discharge efficiency (%)=(Initial discharge capacity/Initial charge capacity)×100

[Evaluation of Continuous Charge Characteristics]

The battery whose initial charge-discharge efficiency was measured was charged at a constant current of 1 It (750 mA) until the voltage of the battery reached 4.4 V and then charged at a constant voltage of 4.4 V until the current reached 1/20 It (37.5 mA). Subsequently, the battery was discharged at a constant current of 1 It (750 mA) until the voltage of the battery reached 2.75 V. Subsequently, the current was changed to 0.2 It (150 mA) and the battery was discharged at a constant current until the voltage of the battery reached 2.75 V. This discharge capacity was defined as a discharge capacity before the test.

The battery whose discharge capacity before the test was measured was charged at a constant current of 1 It (750 mA) until the voltage of the battery reached 4.4 V and then charged at a constant voltage of 4.4 V until the current reached 1/20 It (37.5 mA). Subsequently, the thickness of the battery was measured. Then, constant-voltage charging was performed at 4.4 V in a thermostat at 60° C. for 65 hours. Immediately after the test, the thickness of the battery was measured. The swelling of the battery was determined from the formula below.

Swelling (mm)=Thickness after test−Thickness before test

The battery whose thickness was measured was discharged at a constant current of 1 It (750 mA) until the voltage of the battery reached 2.75 V. Subsequently, the current was changed to 0.2 It (150 mA) and the battery was discharged at a constant current until the voltage reached 2.75 V. Thus, the retention capacity was measured.

The battery whose retention captivity was measured was charged at a constant current of 1 It (750 mA) until the voltage of the battery reached 4.4 V and then charged at a constant voltage of 4.4 V until the current reached 1/20 It (37.5 mA). Subsequently, the battery was discharged at a constant current of 1 It (750 mA) until the voltage of the battery reached 2.75 V. Subsequently, the current was changed to 0.2 It (150 mA) and the battery was discharged at a constant current until the voltage reached 2.75 V. Thus, the recovery capacity was measured. The capacity retention ratio (%) and the capacity recovery ratio (%) were determined from the formulae below. Table 1 shows the results.

Capacity retention ratio (%)=((1 It retention capacity+ 0.2 It retention capacity)/(1 It discharge capacity before test+0.2 It discharge capacity before test))×100

Capacity recovery ratio (%)=((1 It recovery capacity+ 0.2 It recovery capacity)/(1 It discharge capacity before test+0.2 It discharge capacity before test))×100

Example 2

A nonaqueous electrolyte secondary battery was produced in the same manner as in Example 1, except that 2-(trifluoromethyl)-1,3-dioxane-2-carboxylic acid methyl ester (compound 2) represented by general formula (3) below was used instead of the compound 1.

[Chem. 4]

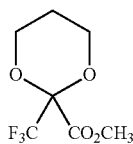

(3)

Subsequently, the initial charge-discharge efficiency, swelling, capacity retention ratio, and capacity recovery ratio of the nonaqueous electrolyte secondary battery produced in Example 2 were measured in the same manner as in Example 1. Table 1 shows the results.

Comparative Example 1

A nonaqueous electrolyte secondary battery was produced in the same manner as in Example 1, except that the compound 1 was not added. Subsequently, the initial charge-discharge efficiency, swelling, capacity retention ratio, and capacity recovery ratio of the nonaqueous electrolyte secondary battery produced in Comparative Example 1 were measured in the same manner as in Example 1. Table 1 shows the results.

Reference Example 1

A nonaqueous electrolyte secondary battery was produced in the same manner as in Example 1, except that 2,2-dimethyl-3,3,3-trifluoropropionic acid methyl ester (compound 3) represented by general formula (4) below was used instead of the compound 1.

[Chem. 5]

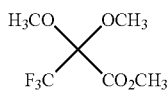

(4)

Subsequently, the initial charge-discharge efficiency, swelling, capacity retention ratio, and capacity recovery ratio of the nonaqueous electrolyte secondary battery produced in Reference Example 1 were measured in the same manner as in Example 1. Table 1 shows the results.

Reference Example 2

A nonaqueous electrolyte secondary battery was produced in the same manner as in Example 1, except that the vinylene carbonate (VC) was not added. Subsequently, the initial charge-discharge efficiency, swelling, capacity retention ratio, and capacity recovery ratio of the nonaqueous electrolyte secondary battery produced in Reference Example 2 were measured in the same manner as in Example 1. Table 1 shows the results.

TABLE 1

| | Amount added (mass %) | | | | | | | |
|---|---|---|---|---|---|---|---|---|
| | Vinylene carbonate | Compound 1 represented by general formula (2) | Compound 2 represented by general formula (3) | Compound 3 represented by general formula (4) | Initial charge–discharge efficiency (%) | Swelling (mm) | Capacity retention ratio (%) | Capacity recovery ratio (%) |
| Example 1 | 1 | 1 | — | — | 89.8 | 0.36 | 85.5 | 83.6 |
| Example 2 | 1 | — | 1 | — | 88.9 | 0.56 | 82.9 | 80.8 |
| Comparative Example 1 | 1 | — | — | — | 89.4 | 0.83 | 80.9 | 79.5 |
| Reference Example 1 | 1 | — | — | 1 | 85.1 | 0.57 | 81.1 | 78.2 |
| Reference Example 2 | — | 1 | — | — | 87.6 | 0.50 | 81.6 | 79.1 |

The following is clear from the results shown in Table 1. In Example 1 in which the compound 1 represented by the general formula (2) was added in addition to vinylene carbonate, the swelling of the battery was small and the capacity retention ratio and the capacity recovery ratio were high compared with Comparative Example 1. In Example 2 in which the compound 2 represented by the general formula (3) was added, the swelling of the battery was also small and the capacity retention ratio and the capacity recovery ratio were also high compared with Comparative Example 1.

In Reference Example 1 in which vinylene carbonate and the compound 3 represented by the general formula (4) were added, the swelling of the battery was suppressed, but the initial charge–discharge efficiency and the capacity recovery ratio were low compared with Comparative Example 1. In Reference Example 2 in which vinylene carbonate was not added but the compound 1 represented by the general formula (2) was added, the swelling of the battery was suppressed, but the initial charge–discharge efficiency and the capacity recovery ratio were low.

Example 3

A nonaqueous electrolyte secondary battery was produced in the same manner as in Example 1, except that the content of the compound 1 in the nonaqueous electrolyte was changed to 0.1 mass %. Subsequently, the initial charge–discharge efficiency, swelling, capacity retention ratio, and capacity recovery ratio of the nonaqueous electrolyte secondary battery produced in Example 3 were measured in the same manner as in Example 1. Table 2 shows the results.

Example 4

A nonaqueous electrolyte secondary battery was produced in the same manner as in Example 1, except that the content of the compound 1 in the nonaqueous electrolyte was changed to 0.5 mass %. Subsequently, the initial charge–discharge efficiency, swelling, capacity retention ratio, and capacity recovery ratio of the nonaqueous electrolyte secondary battery produced in Example 4 were measured in the same manner as in Example 1. Table 2 shows the results.

Example 5

A nonaqueous electrolyte secondary battery was produced in the same manner as in Example 1, except that the content of the compound 1 in the nonaqueous electrolyte was changed to 2 mass %. Subsequently, the initial charge–discharge efficiency, swelling, capacity retention ratio, and capacity recovery ratio of the nonaqueous electrolyte secondary battery produced in Example 5 were measured in the same manner as in Example 1. Table 2 shows the results.

Example 6

A nonaqueous electrolyte secondary battery was produced in the same manner as in Example 1, except that the content of the compound 1 in the nonaqueous electrolyte was changed to 3 mass %. Subsequently, the initial charge–discharge efficiency, swelling, capacity retention ratio, and capacity recovery ratio of the nonaqueous electrolyte secondary battery produced in Example 6 were measured in the same manner as in Example 1. Table 2 shows the results.

TABLE 2

| | Amount added (mass %) | | | | | | | |
|---|---|---|---|---|---|---|---|---|
| | Vinylene carbonate | Compound 1 represented by general formula (2) | Compound 2 represented by general formula (3) | Compound 3 represented by general formula (4) | Initial charge–discharge efficiency (%) | Swelling (mm) | Capacity retention ratio (%) | Capacity recovery ratio (%) |
| Example 3 | 1 | 0.1 | — | — | 88.9 | 0.53 | 84.2 | 82.0 |
| Example 4 | 1 | 0.5 | — | — | 89.7 | 0.37 | 85.1 | 83.3 |
| Example 5 | 1 | 2 | — | — | 88.9 | 0.44 | 84.1 | 81.4 |
| Example 6 | 1 | 3 | — | — | 87.4 | 0.42 | 84.6 | 82.4 |

The following is clear from the results shown in Table 2. In the batteries of Examples 3 to 6 in which the content of the compound 1 represented by the general formula (2) was 0.1 mass % to 3 mass %, the initial charge–discharge efficiency was high and the swelling was suppressed as in Examples 1 and 2. In these batteries, the capacity retention ratio and the capacity recovery ratio were also high as in Examples 1 and 2.

Example 7

A nonaqueous electrolyte secondary battery was produced in the same manner as in Example 1, except that the content of the vinylene carbonate in the nonaqueous electrolyte was changed to 0.1 mass %. Subsequently, the initial charge-discharge efficiency, swelling, capacity retention ratio, and capacity recovery ratio of the nonaqueous electrolyte secondary battery produced in Example 7 were measured in the same manner as in Example 1. Table 3 shows the results.

Example 8

A nonaqueous electrolyte secondary battery was produced in the same manner as in Example 1, except that the content of the vinylene carbonate in the nonaqueous electrolyte was changed to 0.3 mass %. Subsequently, the initial charge-discharge efficiency, swelling, capacity retention ratio, and capacity recovery ratio of the nonaqueous electrolyte secondary battery produced in Example 8 were measured in the same manner as in Example 1. Table 3 shows the results.

Example 9

A nonaqueous electrolyte secondary battery was produced in the same manner as in Example 1, except that the content of the vinylene carbonate in the nonaqueous electrolyte was changed to 0.5 mass %. Subsequently, the initial charge-discharge efficiency, swelling, capacity retention ratio, and capacity recovery ratio of the nonaqueous electrolyte secondary battery produced in Example 9 were measured in the same manner as in Example 1. Table 3 shows the results.

Comparative Example 2

A nonaqueous electrolyte secondary battery was produced in the same manner as in Comparative Example 1, except that the content of the vinylene carbonate in the nonaqueous electrolyte was changed to 0.1 mass %. Subsequently, the initial charge-discharge efficiency, swelling, capacity retention ratio, and capacity recovery ratio of the nonaqueous electrolyte secondary battery produced in Comparative Example 2 were measured in the same manner as in Example 1. Table 3 shows the results.

Comparative Example 3

A nonaqueous electrolyte secondary battery was produced in the same manner as in Comparative Example 1, except that the content of the vinylene carbonate in the nonaqueous electrolyte was changed to 0.5 mass %. Subsequently, the initial charge-discharge efficiency, swelling, capacity retention ratio, and capacity recovery ratio of the nonaqueous electrolyte secondary battery produced in Comparative Example 3 were measured in the same manner as in Example 1. Table 3 shows the results.

The following is clear from the results shown in Table 3. In the batteries of Examples 7 to 9 in which the content of the vinylene carbonate was 0.1 mass % to 0.5 mass %, the initial charge-discharge efficiency was high and the swelling was suppressed as in Examples 1 and 2. In these batteries, the capacity retention ratio and the capacity recovery ratio were also high as in Examples 1 and 2.

In Comparative Examples 3 and 4 in which the compound 1 represented by the general formula (2) was not added, even if the content of the vinylene carbonate was changed to 0.1 mass % to 0.5 mass %, the swelling of the battery was large and the capacity retention ratio and the capacity recovery ratio were low compared with Examples 7 to 9.

REFERENCE SIGNS LIST

1 nonaqueous electrolyte secondary battery
10 electrode body
11 negative electrode
12 positive electrode
13 separator
17 battery case

The invention claimed is:

1. A nonaqueous electrolyte for a nonaqueous electrolyte secondary battery, the nonaqueous electrolyte comprising a lithium salt, vinylene carbonate, and a compound represented by general formula (1) below,

[Chem. 1]

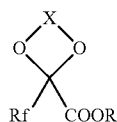

(1)

[in the general formula (1), X is an alkylene group with 2 to 4 carbon atoms that may have a substituent, Rf is a fluorine-containing linear or branched alkyl group with 1 to 6 carbon atoms, and R is a linear, branched, or cyclic alkyl group with 1 to 6 carbon atoms that may have a substituent].

2. The nonaqueous electrolyte for a nonaqueous electrolyte secondary battery according to claim 1, wherein in the general formula (1), X is an alkylene group with 2 or 3 carbon atoms that may have a substituent, Rf is a fluorine-containing linear or branched alkyl group with 1 to 3 carbon atoms, and R is a linear, branched, or cyclic alkyl group with 1 to 3 carbon atoms that may have a substituent.

TABLE 3

| | | Amount added (mass %) | | | | | | |
|---|---|---|---|---|---|---|---|---|
| | Vinylene carbonate | Compound 1 represented by general formula (2) | Compound 2 represented by general formula (3) | Compound 3 represented by general formula (4) | Initial charge-discharge efficiency (%) | Swelling (mm) | Capacity retention ratio (%) | Capacity recovery ratio (%) |
| Example 7 | 0.1 | 1 | — | — | 88.8 | 0.40 | 84.2 | 80.4 |
| Example 8 | 0.3 | 1 | — | — | 88.9 | 0.37 | 84.3 | 80.4 |
| Example 9 | 0.5 | 1 | — | — | 89.3 | 0.37 | 84.8 | 81.8 |
| Comparative Example 2 | 0.1 | — | — | — | 88.8 | 0.63 | 82.7 | 79.9 |
| Comparative Example 3 | 0.5 | — | — | — | 89.3 | 0.80 | 81.9 | 79.1 |

3. The nonaqueous electrolyte for a nonaqueous electrolyte secondary battery according to claim 1, wherein in the general formula (1), Rf is a linear or branched perfluoroalkyl group with 1 to 3 carbon atoms.

4. The nonaqueous electrolyte for a nonaqueous electrolyte secondary battery according to claim 1, wherein in the general formula (1), X is an ethylene group or a propylene group, Rf is a trifluoromethyl group, and R is a methyl group.

5. The nonaqueous electrolyte for a nonaqueous electrolyte secondary battery according to claim 1, wherein the content of the vinylene carbonate in the nonaqueous electrolyte is 0.05 mass % to 2 mass %, and the content of the compound represented by the general formula (1) is 0.05 mass % to 5 mass %.

6. The nonaqueous electrolyte for a nonaqueous electrolyte secondary battery according to claim 1, wherein the nonaqueous electrolyte secondary battery includes a negative electrode that contains a negative electrode active material composed of a carbon material.

7. A nonaqueous electrolyte secondary battery comprising the nonaqueous electrolyte according to claim 1, a positive electrode, a negative electrode, and a separator.

* * * * *